W. SKAKEL.
MANURE LOADER.
APPLICATION FILED DEC. 4, 1912.
1,073,716.
Patented Sept. 23, 1913.
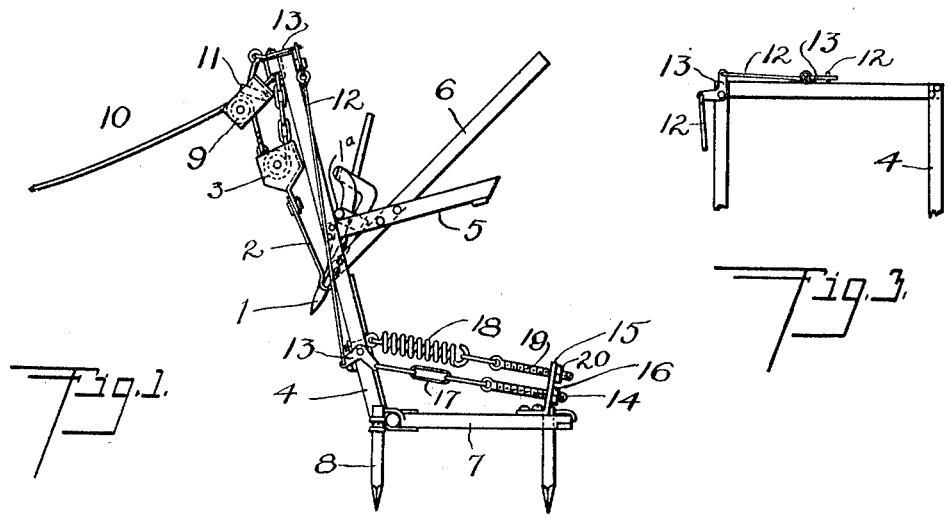
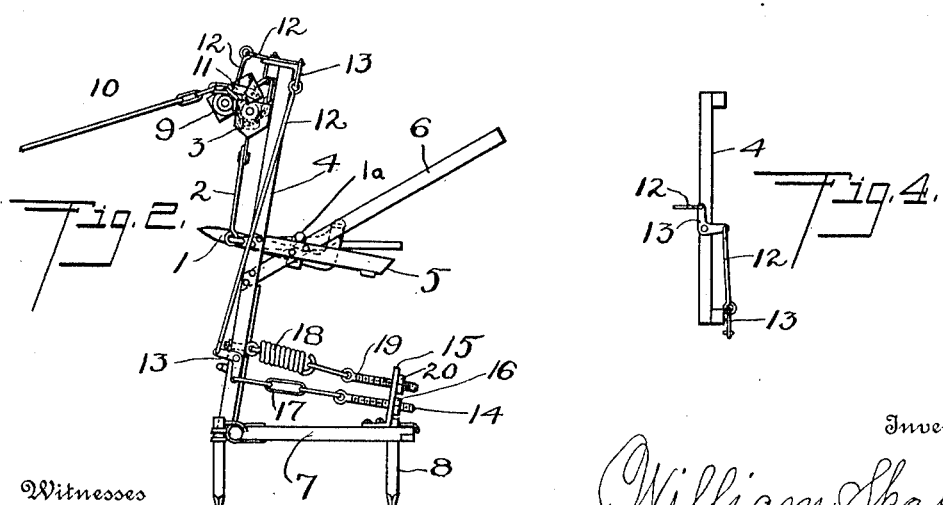

UNITED STATES PATENT OFFICE.

WILLIAM SKAKEL, OF AVON, SOUTH DAKOTA.

MANURE-LOADER.

1,073,716.  Specification of Letters Patent.  Patented Sept. 23, 1913.

Application filed December 4, 1912. Serial No. 734,840.

*To all whom it may concern:*

Be it known that I, WILLIAM SKAKEL, of Avon, in Bonhomme county, in the State of South Dakota, have invented certain new and useful Improvements in Manure-Loaders, and have described the same in the following specification, illustrated by the accompanying drawings.

My invention relates in general to that class of loading apparatus and manure loaders, in which a scraper, movable upon the ground and adapted to gather quantities of manure or the like therefrom, is carried to and from a position of discharge at a suitable distance above the ground by means of a swinging frame pivoted to the ground or to a stationary base by the side of a wagon into which the contents of the scraper drop.

It relates in particular to those loaders of the specified class which are constructed substantially as shown in Letters Patent of the United States No. 984,164, which were issued to me for manure loaders February 14, 1911.

It is the object of the invention to control, in loaders of this class, the tilting movement which is performed by the scraper in discharging its contents; to render this movement of the scraper dependent upon the pivotal movement of the swinging frame by which the scraper is carried to its dumping position; to prevent this movement of the scraper from occurring too soon, or before it has fully reached that position; to predetermine that position variably by adjustment; to return the swinging frame automatically to its lowered position, after the scraper has dumped its load into the wagon; and in general to produce a superior loader of the specified class. To accomplish these objects I incorporate in my improved loader of the specified class a dog for holding the rope which actuates the scraper, tripping mechanism for releasing the dog, means for adjusting the tripping mechanism, and a spring for retracting the swinging frame.

The best manner in which I have contemplated applying the principles of the invention, is shown in said drawings.

In these Figure 1 is a side elevation of a manure loader which is constructed in accordance with these principles and is positioned as when the scraper is discharging its contents. Fig. 2 is a side elevation of the same loader positioned as when the scraper is being carried to its dumping position. Figs. 3 and 4 are details.

This illustrative loader comprises the scraper 1, having a transverse sliding pivot 1ª, the bail 2 secured to the front of the scraper, the sheave 3 secured to the bail, the swinging frame 4 on which the scraper is adapted to be raised above a wagon, the legs 5 and the inclined track 6, which are adapted to sustain the middle and the free end of the swinging frame above the ground, the base 7, which is anchored to the ground by the side of a wagon by the corner stakes 8, the sheave 9 secured to the free end of the swinging frame, and the operating rope, or cable, 10, which is attached to the swinging frame, and runs in said sheaves; all constructed and operated in the same general manner as the typical loader of the specified class, namely, the loader described and shown in my said Patent No. 984,164.

In the block of the sheave 9 is pivoted the dog 11, which is adapted to bite the rope or cable 10 and thereby to stop and hold the scraper 1 by its bail 2 in the carrying position shown in Fig. 2. The attached end portion of the cable is preferably composed of metallic links, as shown, since they are readily engaged by the dog and not soon worn out by repeated engagements. The mechanism for tripping the dog comprises the connecting-rods 12, the bellcrank levers 13, the chain 17, the bolt 14, longitudinally slidable in its seat in the bracket 15 on the base 7 by means of the adjusting nut 16. The coiled spring 18 for retracting the swinging frame, is similarly attached to the same bracket by the bolt 19 and the nut 20, whereby the drawing tension of the spring is adjusted.

The operation of the loader with my improvements is as follows: After the scraper has been loaded by drawing it forward on the ground, after the usual manner of such scrapers, it is still drawn forward by the operating rope 10 connected thereto by the bail 2, and is thereby caused first to slide onto the ascending two-rail track 6 which is carried by the swinging frame 4 standing on the ground on its legs 5. As the pull of the rope continues, the scraper, whose opposite ends slide respectively on the rails of that track, travels up and along the latter until the sheave 3 meets and is stopped by the sheave 9 near the free end of the swinging frame. Then, as the pull still continues, that frame, together with the track 6, is swung pivotally from its position on the ground, through the intermediate position shown in Fig. 2, to the extreme forward position shown in Fig. 1. Thereby the scraper, riding upward and forward on and with the swinging track, is carried in a generally horizontal posture to a position above the wagon into which its contents are to be discharged by the pivotal tilting of the scraper to its inclined position shown in Fig. 1. In this posture the scraper is held till the rope 10 is slackened and is released by the dog 11. The tripping of the dog which holds the rope, is timed by the described bolt-and-nut adjustment of the tripping mechanism to occur at the instant, and not before the instant, when the scraper has reached its described extreme forward position. When the rope is released by the dog, the scraper, which is supported on the track rails by its transverse sliding pivot $1^a$, tips forward to the position shown in Fig. 1, drops its contents into the bed of the wagon below, and is then pulled back by hand or otherwise for another load. The operating power being released, this pulling back of the scraper causes or permits the swinging frame to return to its original position supported on the ground by the legs 5.

I claim as my invention—

1. A loader of the specified class, comprising a stationary base, a frame pivoted to the base and carrying an inclined track, a scraper movable both on the ground and also on the track, an operating cable engaging the scraper and the pivoted frame, a dog for engaging the cable, and adjustable automatic means for tripping the dog.

2. A loader of the specified class, comprising a scraper movable over the ground, a pivoted frame adapted to raise the scraper above the ground, a cable actuating the scraper and the frame, and means for automatically holding and releasing the cable.

3. A loader of the specified class, comprising a scraper, a bail secured to the front of the scraper, a sheave secured to the bail, a frame on which the scraper is adapted to be raised above a wagon, means for pivoting the frame at the side of a wagon, a sheave secured to the frame, an operating cable secured to the frame and running in the sheaves, a dog for stopping and releasing the cable, and means for controlling the action of the dog by the position of the frame.

4. A loader of the specified class, comprising a scraper, a pivoted frame adapted to raise the scraper from the ground, a cable actuating the frame and the scraper, a dog to engage the cable, means for tripping the dog, and a spring acting upon the frame against the pull of the cable.

5. A manure loader of the specified class, comprising a scraper, a bail secured to the scraper, a sheave secured to the bail, a pivoted frame adapted to be raised above a wagon, legs or an inclined track supporting one end of the frame above the ground, means for securing the other end of the frame at the side of a wagon, a sheave secured to the raised end of the frame, a cable running in the sheaves, means for controlling the running of the cable, and means for retracting the raised frame when the cable is released.

In testimony whereof I hereunto set my signature in the presence of two witnesses.

WILLIAM SKAKEL.

In the presence of—
WILLARD EDDY,
EVA CAYLEY.

---

Copies of this patent may be obtained for five cents each, by addressing the "Commissioner of Patents, Washington, D. C."